Sept. 16, 1969     A. J. VAN NOORD     3,467,465

REARVIEW MIRROR ACTUATOR

Filed Sept. 16, 1965

INVENTOR.
ANDREW J. VAN NOORD
BY Price & Heneveld
ATTORNEYS

United States Patent Office 3,467,465
Patented Sept. 16, 1969

3,467,465
REARVIEW MIRROR ACTUATOR
Andrew J. Van Noord, Grand Rapids, Mich., assignor to Donnelly Mirrors, Inc., Holland, Mich., a corporation of Michigan
Continuation-in-part of application Ser. No. 475,979, July 30, 1965. This application Sept. 16, 1965, Ser. No. 487,732
Int. Cl. G02b 17/00; A47g 1/24
U.S. Cl. 350—281                                  4 Claims

ABSTRACT OF THE DISCLOSURE

A "caseless" rearview mirror assembly, including a mirror element and a rimless molded backing portion, with a bracket element secured to the backing portion by being embedded into it, together with a second bracket pivotally attached to the first and having a lever-like actuating member extending through a slot in the first bracket disposed at an angle with respect to the mirror element, such that movement of the operating lever moves the first bracket and the mirror element with respect to the second bracket.

---

This is a continuation of my previous application, Ser. No. 475,979, filed July 30, 1965, and now abandoned.

This invention relates to means for actuating rearview mirrors for automobiles and the like to effect changes in their reflecting position, and more particularly to a new and unusual such means particularly adapted for use with "caseless" rearview mirrors and having improved and desirable features.

Automobiles have of course utilized rearview mirrors for a long time, and problems associated with the reflection of the head lights from a following vehicle into the eyes of the driver of a leading vehicle have attended the usage of these mirrors for a period of many years. Mirrors having non-parallel front and rear surfaces and embodying prismatic principles were evolved to solve this basic problem, but all such mirrors require an actuating means to change the reflecting position of the mirror under night driving conditions in order to take advantage of the second image which such mirrors provide.

Previous such actuating mechanisms involved several limitations. In the first place, relatively recently the assignee of the present invention has developed a new automobile mirror construction of a type which is termed a "caseless" mirror. Mirrors of this type are disclosed in the following U.S. patent applications, Ser. No. 252,751, filed Jan. 21, 1963, now abandoned; Ser. No. 431,921, filed Feb. 11, 1965; Ser. No. 439,024, filed Mar. 11, 1965; and Ser. No. 439,041, filed Mar. 11, 1965. Such "caseless" mirrors do not have the typical mirror-retaining backing plate or casing having the usual curved lips or flanges around the edge, between which the mirror is fitted and which grip the edges of the mirror to provide a means for mounting it in a desired position. Instead, "caseless" mirrors are bonded to or embedded in a moulded polyvinyl or other plastic-type backing portion. "Caseless" mirrors to some extent simulate and resemble conventional mirrors with their typical but more expensive metal casings, but have many advantages over such typical casings. Thus, where "caseless" mirrors are used, there is no structure to which a conventional mirror actuating apparatus may be bolted, riveted, or otherwise mechanically fastened, although the need for actuating means continues. Further, the typical conventional actuating means provides no suitable structure for indexing the operating handle or other actuating member to retain it in a desired position, and consequently the normal level of engine and road vibration gradually and continuously changes the reflecting position of the mirror away from the desired selected one, to an undesired and inappropriate position.

Accordingly, it is a major object of the present invention to provide a position-changing actuating means for use in connection with "caseless" rearview mirrors.

Another object of the present invention is to provide a position-changing actuating means for rearview mirrors whose control member is always resiliently biased toward a selected position, and which consequently constantly resists any undesired changes in that position.

The foregoing major objects of the present invention, together with a variety of other desirable features and attributes thereof, will become more apparent to those skilled in the pertinent art following consideration of the ensuing specification and its appended claims, particularly when taken in conjunction with the accompanying drawings setting forth a preferred embodiment thereof.

Briefly stated, the present invention accomplishes its objects and advantages by structure which includes a "caseless" mirror means having a reflective element and a moulded backing portion secured thereto, a first bracket means embeddedly secured to the moulded backing portion, a second bracket means hingeably or otherwise rotatably connected to the first bracket means, a mounting mounting structure pivotally connected to the second bracket means, and structure associated with the first and second bracket means defining a cam surface and an actuating follower means for cooperatively effecting relative movement between the said bracket means about their rotatable connection, in response to movement of the actuating follower means by the operator, to thereby change the reflecting position of the mirror means. Further, the novel mirror-actuating structure provides means associated with the cam and follower means for providing in effect an over-center operational movement thereto, such that the follower means tends to remain in a selected position by resisting motion toward an opposite position. Thus, changes in the position of the mirror reflecting element are positively made, and will remain undisturbed until a deliberate movement of the follower means is undertaken.

Figure 1:
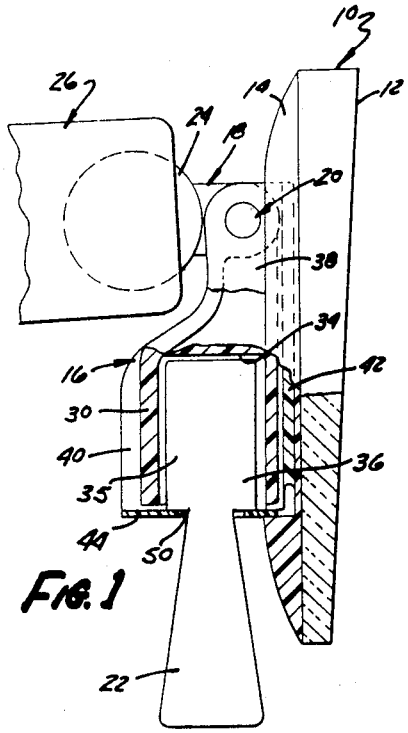
FIG. 1 is a fragmentary, cross-sectional, side elevation of a typical "caseless" mirror, showing the novel actuating means assembled therewith.

Referring now in more detail to the drawings, in FIG. 1 a typical caseless mirror means is illustrated at 10. This includes a reflective element 12 which, instead of the conventional metal or other mirror casing, has a moulded backing portion 14 which is bonded or otherwise suitably secured to the reflective element. It will be recognized that the illustrated reflective element 12 is of the prismatic type, having non-parallel front and rear surfaces, by which second surface and first surface images are obtained for use in day and night driving conditions, respectively. The moulded backing portion 14 is preferably a plastic substance such as polyvinyl or the like, and this term as used herein is intended to include all equivalent backing types, as distinguished from the conventional wrap-around mirror casing. As will be appreciated, the moulded-type backing resembles the conventional mirror casing to some extent, but is much less expensive to produce and apply, and consequently has found quite extensive usage.

Figure 4:
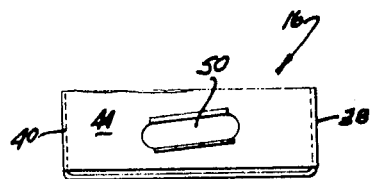
FIG. 4 is a bottom plan view of the structure of FIG. 3 showing further details thereof.
Figure 3:
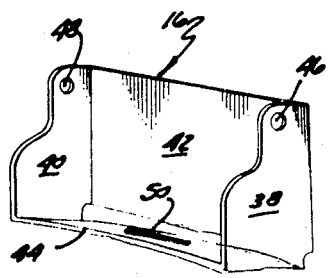
FIG. 3 is a frontal perspective view of another component element of the actuating means.

The preferred moulded backing portion 14 of the caseless mirror means 10 has secured thereto a first bracket means 16 (see FIGS. 1, 3 and 4). The bracket means is preferably joined to the backing portion by being embedded therein while the backing portion is in a plastic state. In this manner, the bracket means 16 is securely joined to the backing portion, and since the reflective element 12 is firmly secured to the other side of the backing portion, any movement of the first bracket means 16 will effect a corresponding movement of the reflective element 12.

A second bracket means 18 (see FIGS. 1 and 2) interfits with the first bracket means 16 in a manner to be seen subsequently, and is pivotally connected thereto along a pintle axis 20. The second bracket means 18 includes a vertically-depending actuating lever 22 which, as will be seen, initiates rotative relative movement between the first and second bracket means. Further, the second bracket means carries a rearwardly-oriented ball member 24, by which it may be universally or pivotally mounted to a suitable socket-forming mounting member 26, which is affixed in any conventional manner to the automobile or other vehicle in which the mirror means is to be mounted.

Figure 2:
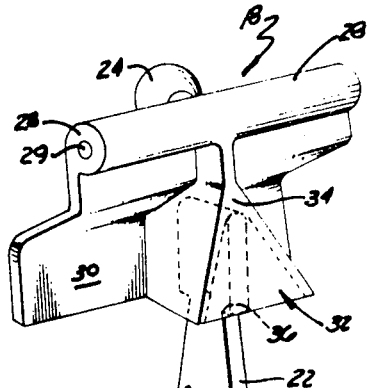
FIG. 2 is a frontal perspective view of one of the component elements of the actuating means.

The second bracket means 18 is seen in detail in FIG. 2. It will here be noted that this member includes a generally cylindrical hub portion 28 which extends horizontally across the top of the bracket and which has a concentric cylindrical bore 29 formed therein. The ball mounting member 24 is joined to the bracket means at the center of this cylindrical portion, and the axis of the ball is in the same general horizontal plane as the axis of the cylindrical portion. A curved skirt portion 30 depends from the cylindrical portion 28 in a manner shown, and a laterally-extending structure 32 having an inverted Y-shaped configuration is secured to or made integral with the skirt portion 30. The downwardly-diverging arms of the Y-shaped lateral structure 32 are connected at their top by a smoothly curved web 34, (FIGS. 1, 2, and 5) and define a triangular cavity, as shown. The downwardly-depending actuating lever 22 first seen in FIG. 1 is positioned within this cavity so as to be rotatable relative thereto, with the rounded upper extremity of the lever resting against the curved surface of the web 34. Also, the actuating lever 22 has a laterally-extending projection 36 thereupon, positioned near the bottom extremity of the triangular cavity. The purpose for this will subsequently become more apparent.

Figure 5:
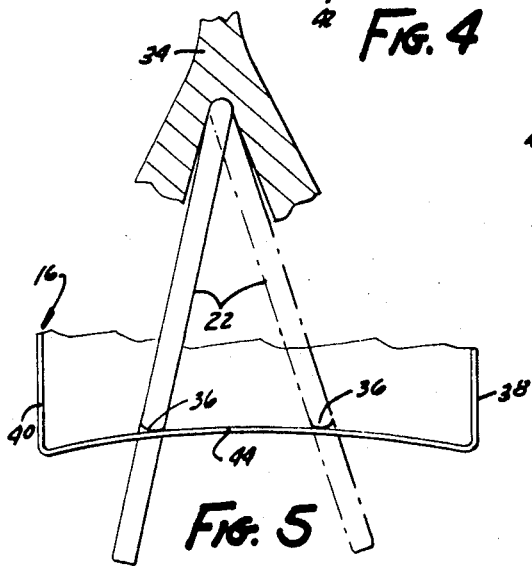
FIG. 5 is an enlarged, fragmentary, side elevation of the element shown in FIG. 3, further illustrating the same and indicating in phantom the cooperative action of the actuating member therewith.

The first bracket means 16 is seen in detail in FIGS. 3, 4 and 5. It will here be seen that this member is basically a partial enclosure having sheet-like sides 38 and 40, a similar front 42, and a bottom portion 44. The sides 38 and 40 of the bracket means are preferably contoured to correspond to the shape of the curved skirt 30 of the second bracket means 18, as shown. Also, the upper extremity of each of the sides 38 and 40 has an aperture 46 and 48, respectively, formed therethrough for alignment with the cylindrical passage 29 at the top of bracket means 18, which has been noted previously. It is to be noted (FIGS. 3 and 5) that the generally horizontally-extending bottom portion 44 of the bracket means 16 is preferably slightly arcuate, so as to be arched somewhat across its center extremities. Further, as FIG. 4 best illustrates, the bottom portion 44 of the bracket means has formed therein an elongated slot 50 or draw-neck which, as illustrated, is positioned at a small acute angle (approximately ten degrees) relative to the plane of the front portion 42 of the bracket.

In assembling the mirror and actuating means, the generally flat front 42 of the first bracket means 16 is embedded into the moulded backing portion 14 of the mirror means 10, with the sides 38 and 40 of the bracket means in a generally vertical position. The second bracket means 18 is then pivotally connected to the first bracket means 16, by aligning the cylindrical passage 29 of the former with the apertures 46 and 48 in the sides of the latter, and inserting a suitable pintle or journaling pins (not shown) therethrough. As will readily be understood, such pins may be threadedly engaged or splined into the ends of the passage 29 as may be desired.

The actuating lever 22 passes through the angled slot 50 in the bottom of the first bracket means 16, and extends into the triangular cavity formed in structure 32 of the second bracket means 18, with the curved top of the lever in abutment against the curved surface of the web 34. (Note FIGS. 1, 4, and 5) The lever is secured in this position by the constant upward force exerted against the lever projection 36 by the arcuate bottom portion 44. The ball member 24 of the second bracket means 18 is then engaged with the socket formed by mounting member 26, as is indicated in FIG. 1.

Operation

To operate the mirror-actuating means, a desired reflecting position for the reflecting element 12 is initially obtained by movement of the ball member 24 within mounting member 26, to nominally position the entire apparatus. Under these circumstances, the actuating lever 22 will be at one or the other of its extreme positions, i.e., at either end of the slot or draw-neck 50. Then, when night driving conditions are encountered and the reflected headlights from following vehicles become a problem, the actuating lever 22 is merely moved to its other extreme position, that is, to the other end of the slot 50.

Since the actuating lever 22 is retained within the cavity of structure 32 for swinging, rotatable movement in a single vertical plane (see FIGS. 1, 2 and 5), the second bracket means 18 and the ball member 24 do not change the position relative to support 26 in which they have been placed. However, due to the fact that slot 50 is oriented at an angle relative to the plane of rotation of actuating lever 22, the slot and actuating lever in effect provide a cam surface and follower means. That is, as the lever is moved within the slot it acts against the sides thereof to move the first bracket means 16 relative to the second bracket means 18, in a rotational movement about the pintle 20 axis formed by the journaling pins passing through apertures 46 and 48 and into the cylindrical passage 29 of the second bracket means. Consequently, when the first bracket means is moved in this manner the mirror means 10 is moved also, and when the actuating lever has been placed in its opposite position, the mirror means will have been placed in a second position in which the reflected headlights are directed away from the eyes of the driver and replaced by an image of greatly diminished brillance. The precise degree of movement effected in this manner will of course vary depending upon such things as the length of the slot 50 and its angular relationship toward the mirror means 10, but it is to be noted that the movement in repositioning the reflecting position of the mirror will be related to the angular relationship between the two surfaces of the reflecting element and the index of refraction of the material from which the reflecting element is made.

As has been noted, the actuating lever 22 carries a lateral projection 36 (FIGS. 1, 2 and 5), and this projection is arranged to lie in contact with the upper surface of the bottom 44 of the first bracket means 16, while the remainder of the lever 22 extends through slot 50. As has also been noted, the bottom 44 is preferably slightly arcuate, and is arched upward slightly over its central extremities. Accordingly, the upper extremity of lever 22 is continuously held in place within web 34, and when the lever 22 is moved from one position to the other, the projection 36 will bear against and resiliently deform the arcuate bottom 44 downwardly as it passes thereacross. This resilient deformation in effect biases the movement of the lever 22 to give the effect of an over-center operation, in which the lever tends to remain in either of its extreme positions at the ends of slot 50 by resisting movement across the arcuate bottom 44. Thus, inadvertent changes in the reflecting position of the mirror means due to road vibration and the like is completely avoided.

Figure 6:
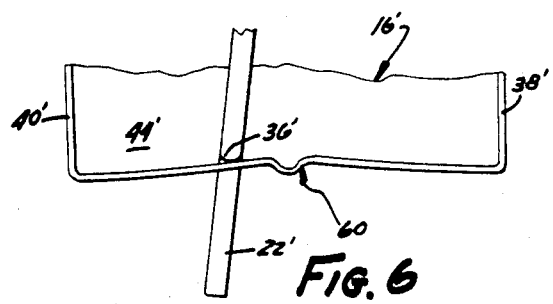
FIG. 6 is an enlarged, fragmentary assembly elevation of a further embodiment of the elements of FIGS. 2 and 3.

A slightly modified further embodiment 16' of the first bracket means 16 is illustrated in FIG. 6, wherein structural elements corresponding to those of the previous figures are assigned corresponding primed numerical designations. In FIG. 6, the preferred arcuate form for the bottom 44' of the bracket means is exaggerated somewhat, and it will be noted that a detent 60 is formed therein at the center thereof. From this, it will be quite apparent that the over-center movement of actuating lever 22' across the surface of bottom portion 44' will be arrested when the projection 36' on the lever drops into the detent 60. In this manner, three (or more, if this is desired) stable indexed positions for the lever and, consequently, the mirror means, are provided, while the resiliently biased actuating movement of the lever is nonetheless maintained and provided between any two of the stable, indexed positions.

While specific preferred embodiments of the inventive mirror actuating means have been illustrated and disclosed herein, it will be apparent to those skilled in the art that other analogous embodiments, as well as various modifications in these embodiments, are entirely feasible.

I claim:
1. Actuating means for changing the reflecting position of rearview mirrors comprising in combination: a mirror means including a reflective element; first bracket means fixedly secured to said mirror means; second bracket means; a horizontally oriented pintle structure rotatably connecting said first and second bracket means; means for pivotally connecting said second bracket means to a desired mount structure; said first bracket means having a generally horizontally disposed, resilient, centrally arcuate flange defining an elongated slot disposed at an acute angle relative to the plane of said reflective element; and said second bracket means having a generally vertically disposed actuating lever rotatable relative thereto and passing through said slot; said actuating lever when rotated relative to said second bracket means moving generally parallel to the plane of said reflective element and within said slot to move said first bracket means accordingly, thereby changing the reflecting position of said mirror means; and said actuating lever having an exposed shoulder bearing vertically against said flange to resiliently deform its said arcuate central portions as it is moved thereacross during said relative movement of the lever, such that an over-center operation results in which the lever tends to remain in a given position once thereby resisting motion across said arcuate flange portion to an opposite position.

2. The actuating means of claim 1, wherein said flange further defines at least one detent for engaging said actuating lever shoulder to index said lever at a predetermined position relative to the flange.

3. Actuating means for changing the reflecting position of rearview mirrors of the "caseless" type comprising in combination: a "caseless" mirror means including a reflective element and a moulded backing portion secured thereto; first bracket means embeddedly secured to said backing portion; second bracket means; horizontally oriented pintle structure rotatably connecting said first and second bracket means; means for pivotally connecting said second bracket means to a desired mounting structure; said first bracket means having a generally horizontally disposed, resilient, centrally arcuate flange defining an elongated slot disposed at an acute angle relative to the plane of said reflective element; and said second bracket means having a generally vertically disposed actuating lever rotatable relative thereto and passing through said slot; said actuating lever when rotated relative to said second bracket means moving generally parallel to the plane of said reflective element and within said slot to move said first bracket means accordingly, thereby changing the reflecting position of said mirror means; and said actuating lever having an exposed shoulder bearing vertically against said flange to resiliently deform its said arcuate central portions as it is moved thereacross during said relative movement of the lever, such that an over-center operation results in which the lever tends to remain in a given position once there by resisting motion across said arcuate flange portion to an opposite position.

4. The actuating means of claim 3, wherein said flange further defines at least one detent for engaging said actuating lever shoulder to index said lever at a predetermined position relative to the flange.

References Cited
UNITED STATES PATENTS

| | | | |
|---|---|---|---|
| 2,052,770 | 9/1936 | Hofer | 350—279 |
| 2,910,915 | 11/1959 | Harris | 350—280 |
| 2,995,982 | 8/1961 | Scheitlin et al. | 350—281 |

JOHN K. COBBIN, Primary Examiner

U.S. Cl. X.R.

248—479